Figure 3:
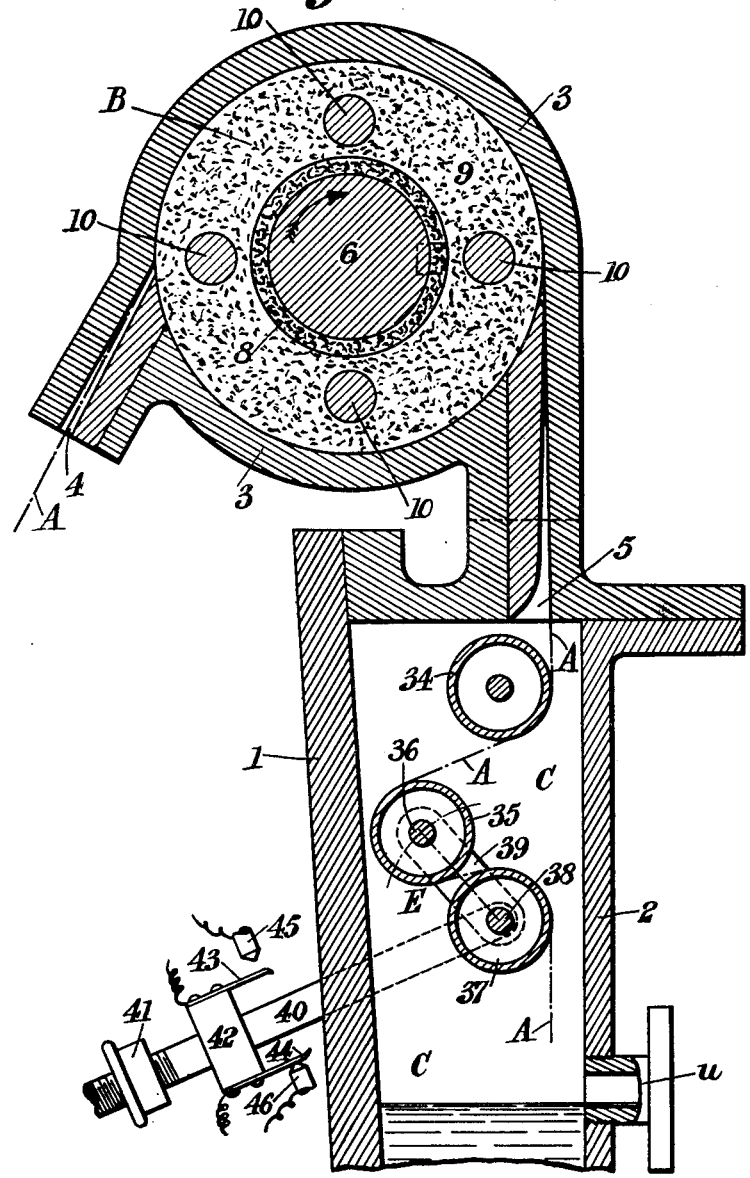

Dec. 27, 1932.   A. H. KILNER   1,892,579
APPARATUS FOR THE PRODUCTION AND MANUFACTURE OF MATERIAL IMPREGNATED WITH
CELLULOSE REGENERATED FROM VISCOSE OR OTHER CELLULOSIC SOLUTIONS
Filed May 3, 1932   13 Sheets-Sheet 1
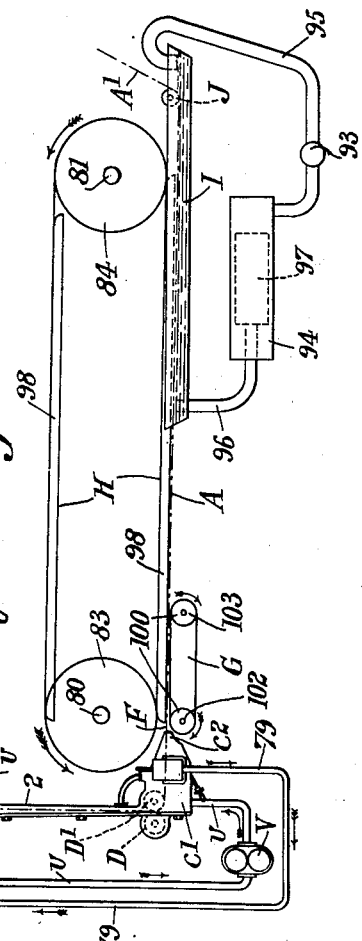
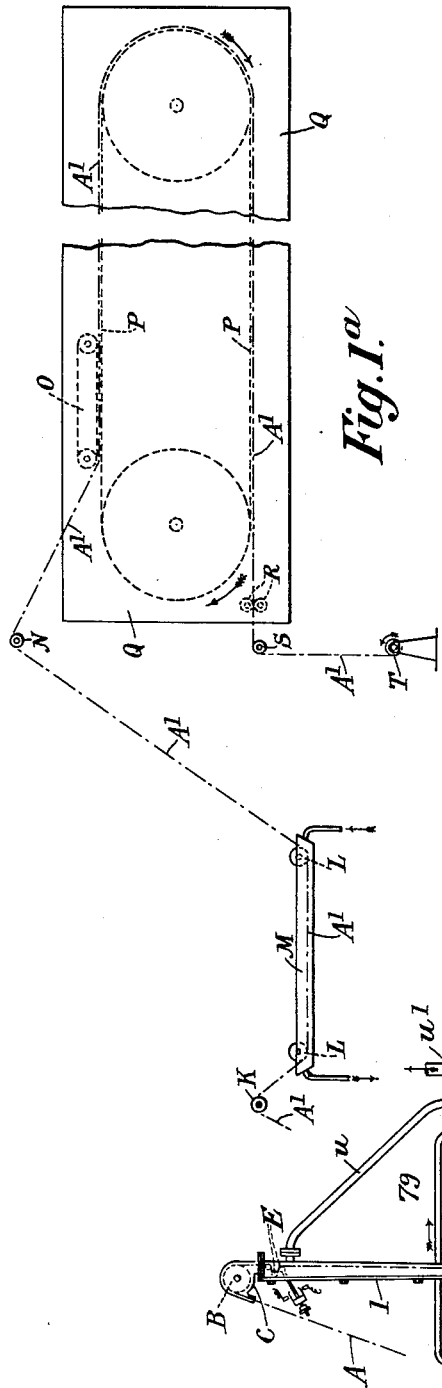
INVENTOR
ARTHUR HUGOE KILNER
BY HIS ATTORNEYS
Howson and Howson

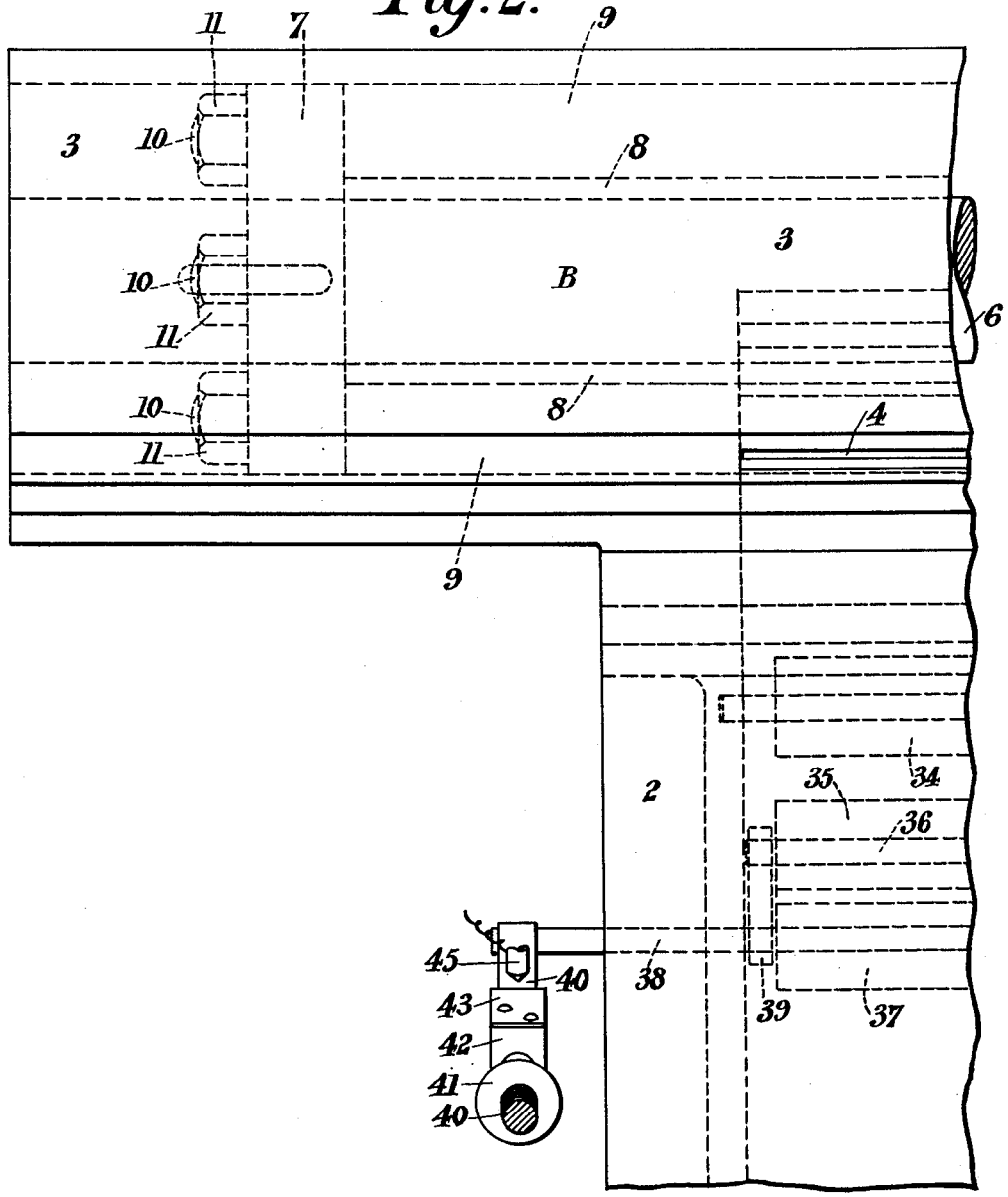

Dec. 27, 1932. A. H. KILNER 1,892,579
APPARATUS FOR THE PRODUCTION AND MANUFACTURE OF MATERIAL IMPREGNATED WITH
CELLULOSE REGENERATED FROM VISCOSE OR OTHER CELLULOSIC SOLUTIONS
Filed May 3, 1932 13 Sheets-Sheet 3

INVENTOR
ARTHUR HUGOE KILNER
BY HIS ATTORNEYS
Howson and Howson

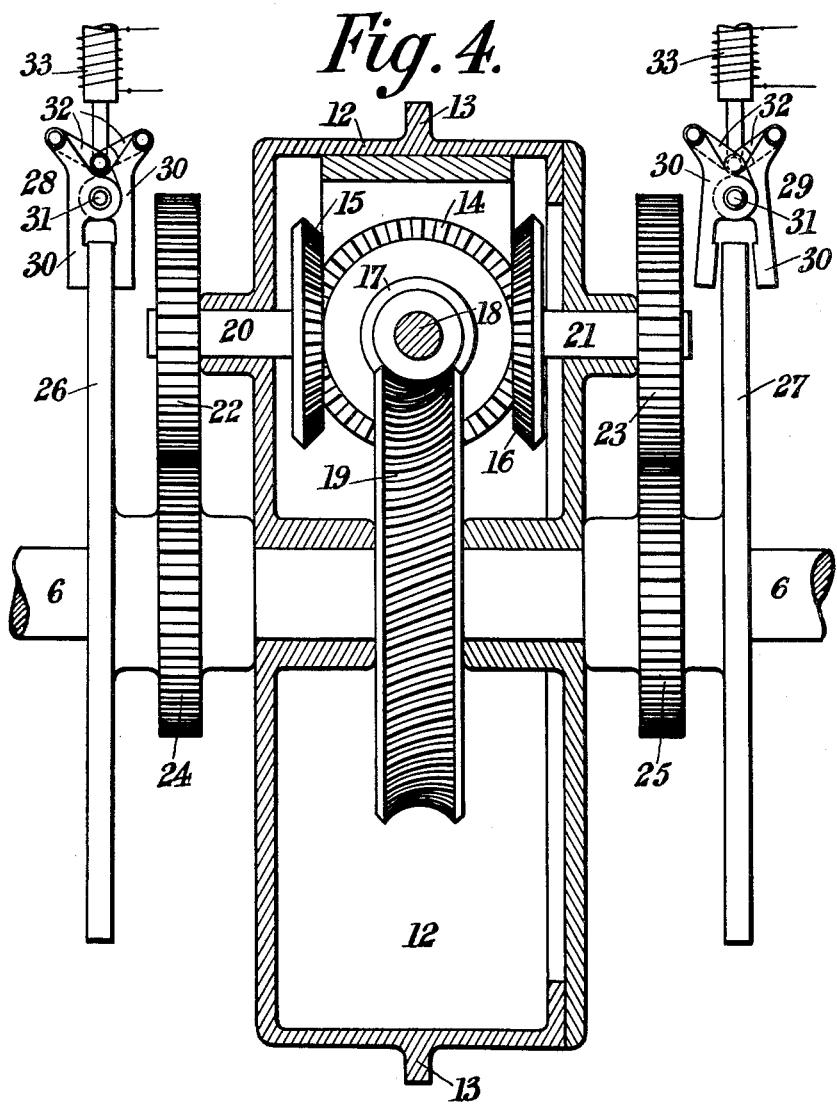

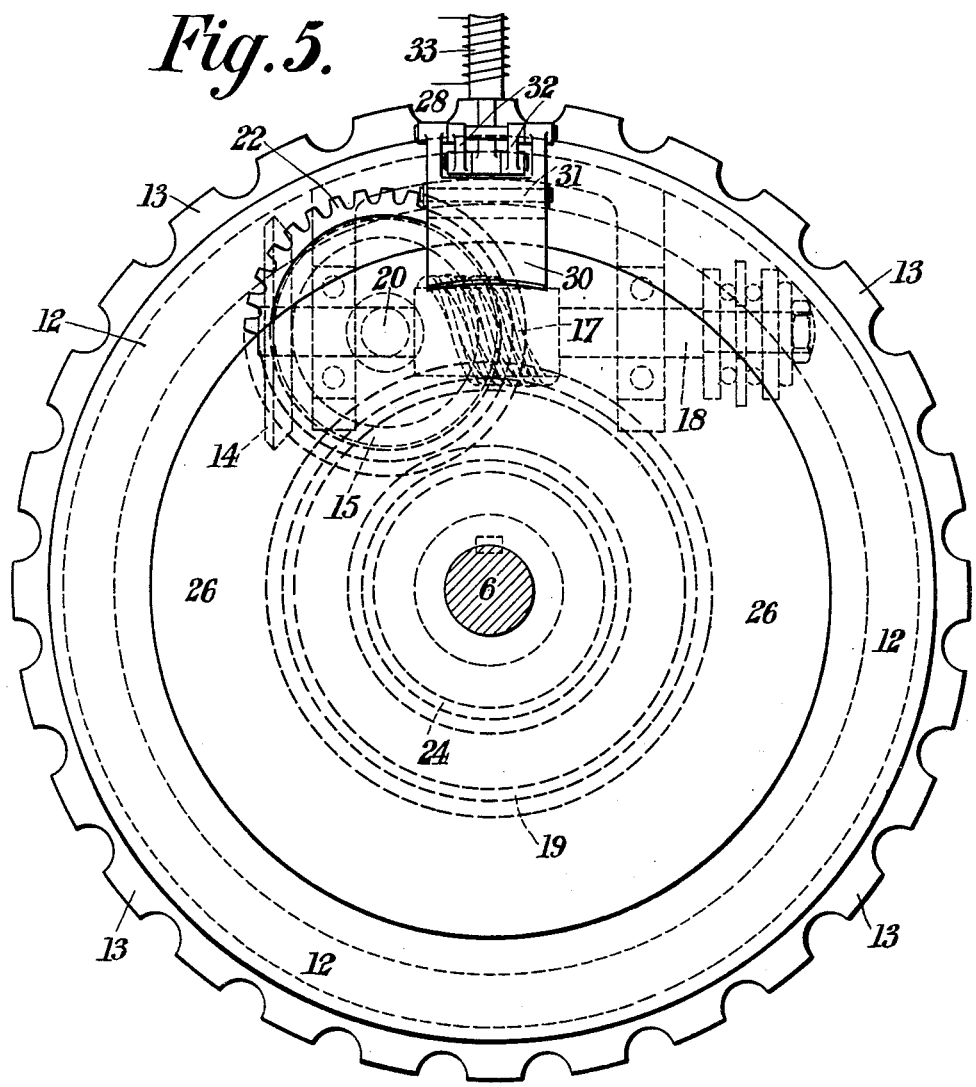

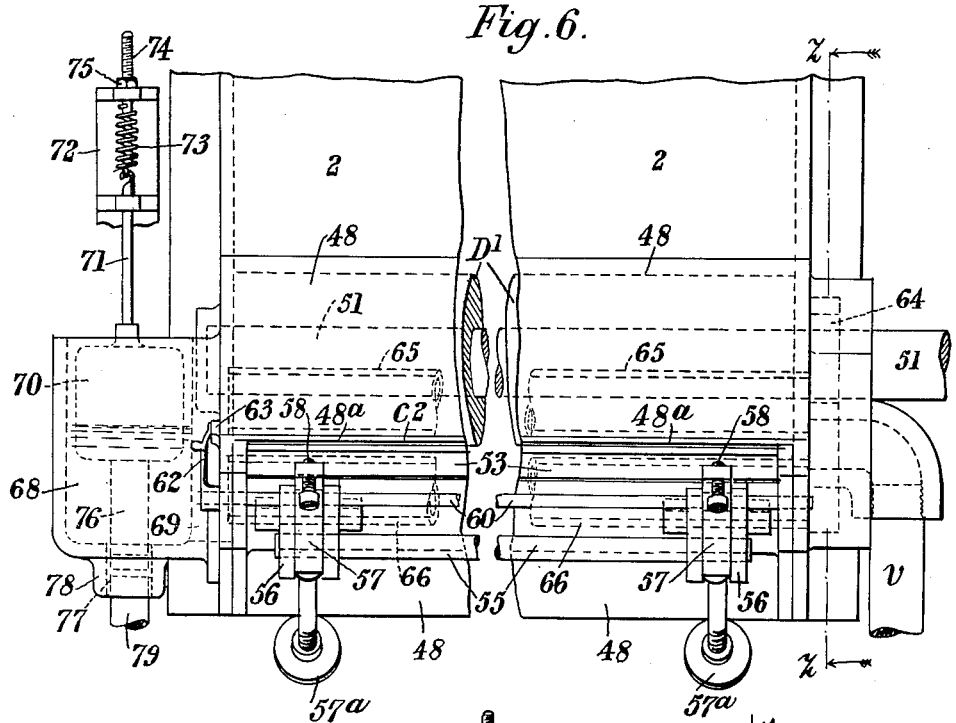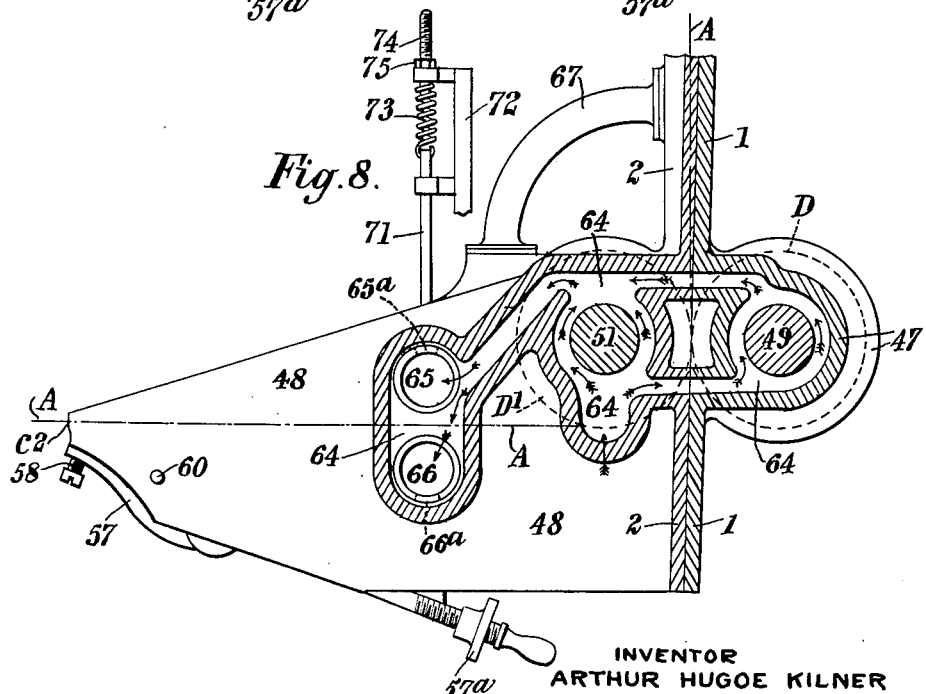

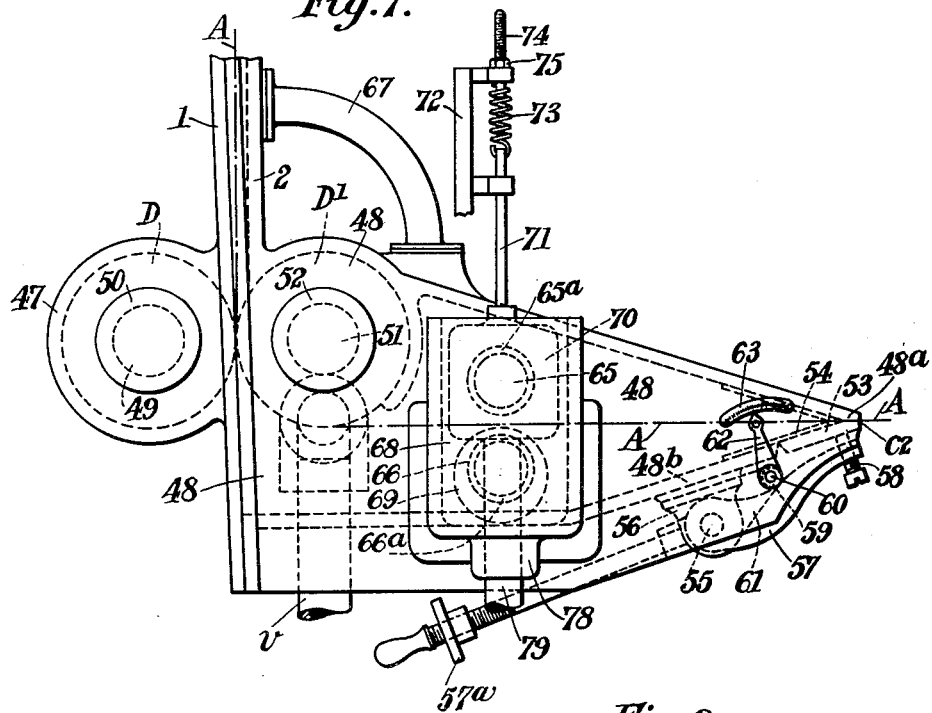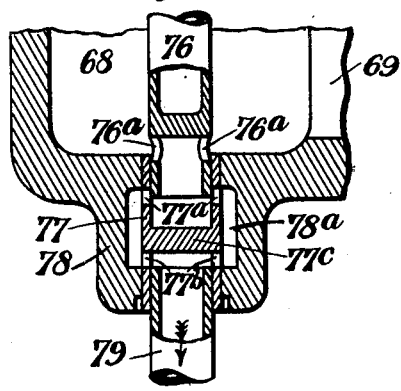

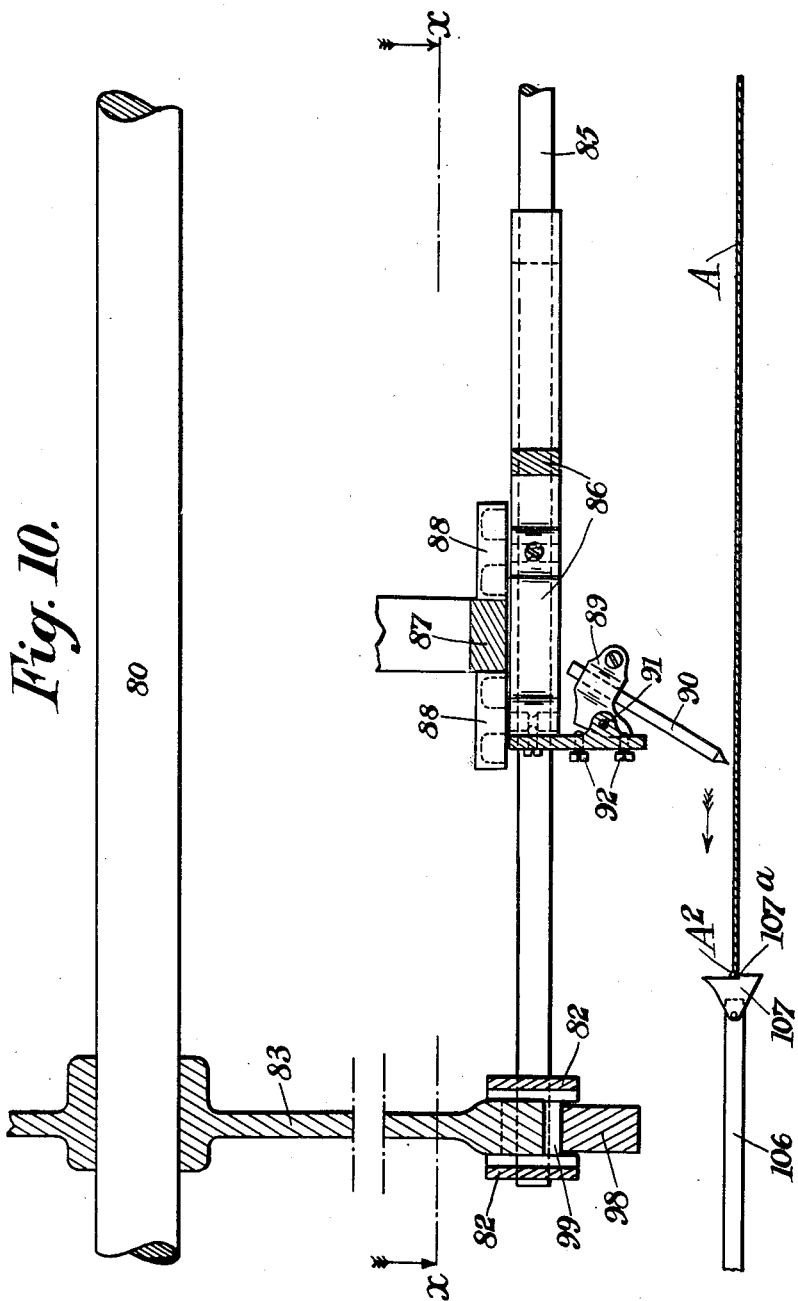

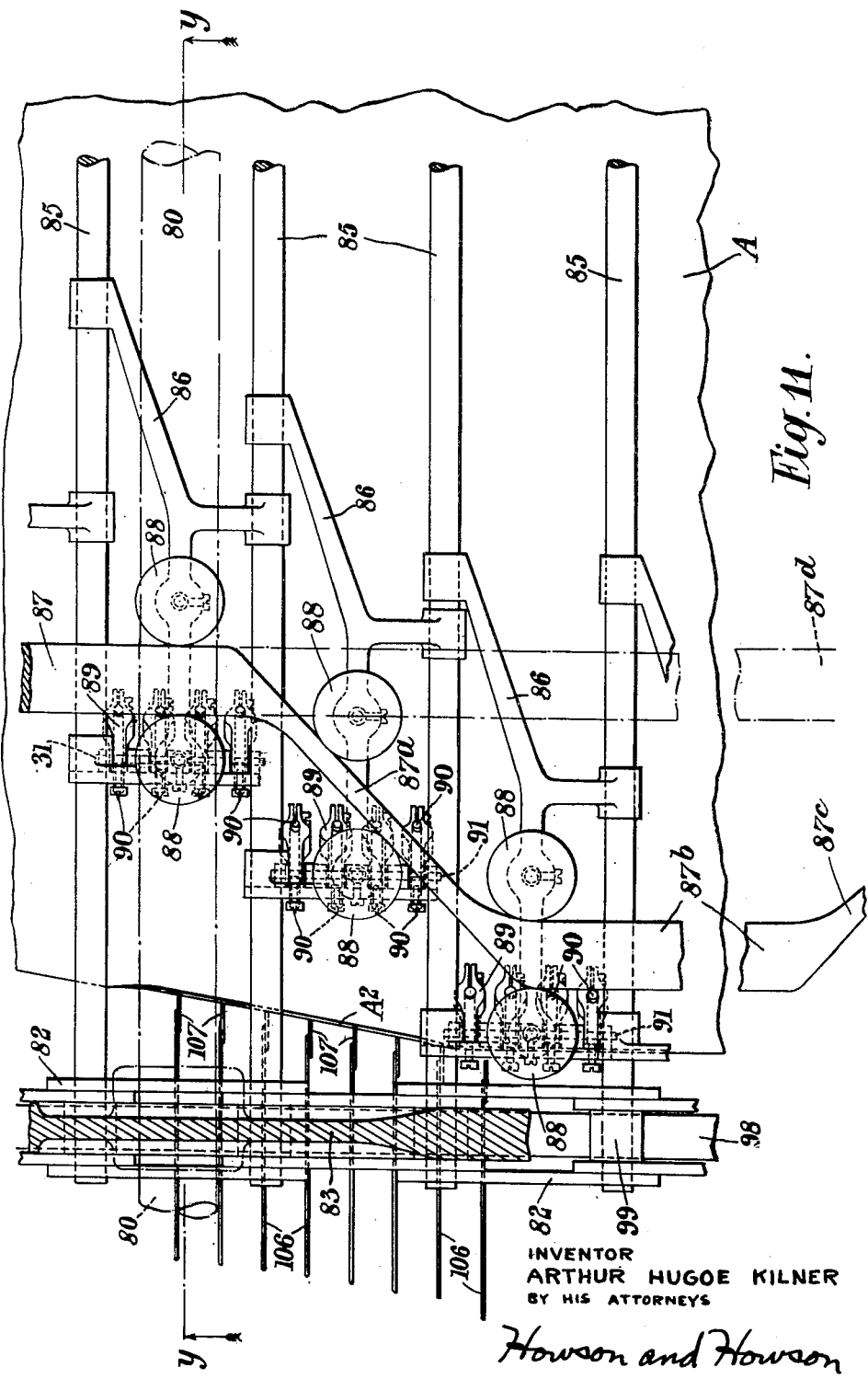

Fig. 12
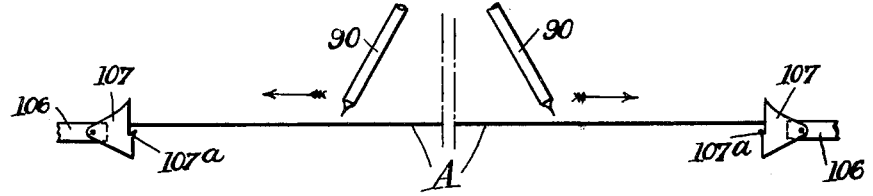
Fig. 14
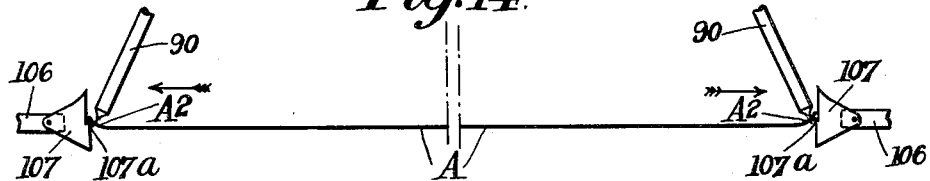
Fig. 13
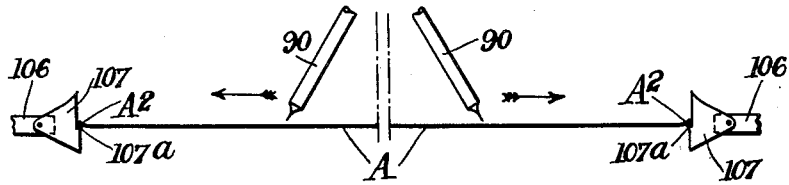
Fig. 15
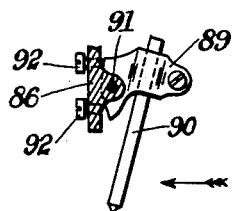
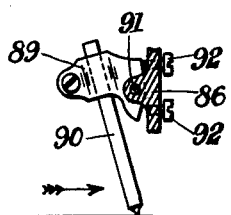
INVENTOR
ARTHUR HUGOE KILNER
BY HIS ATTORNEYS
Howson and Howson

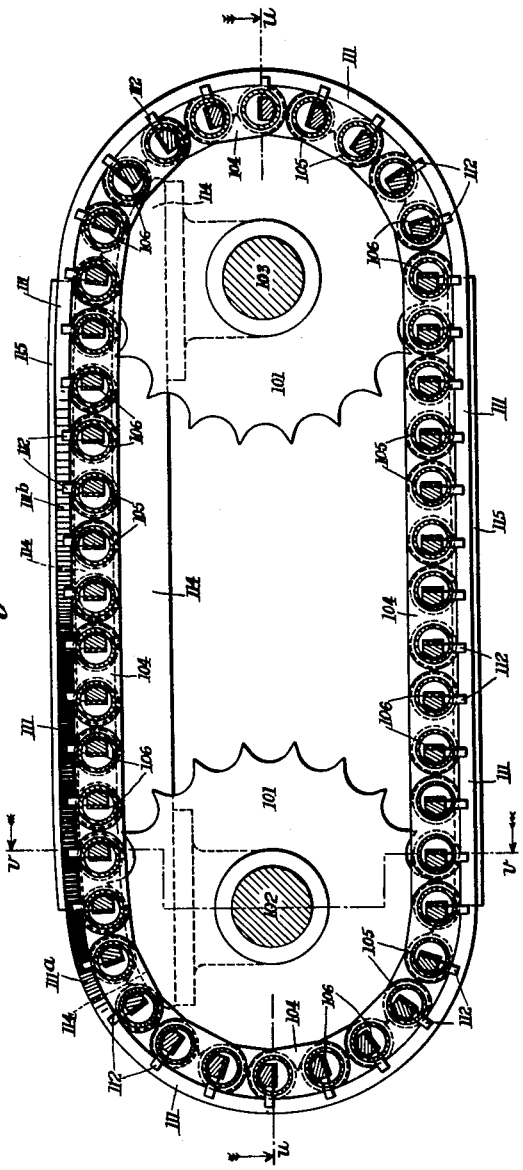

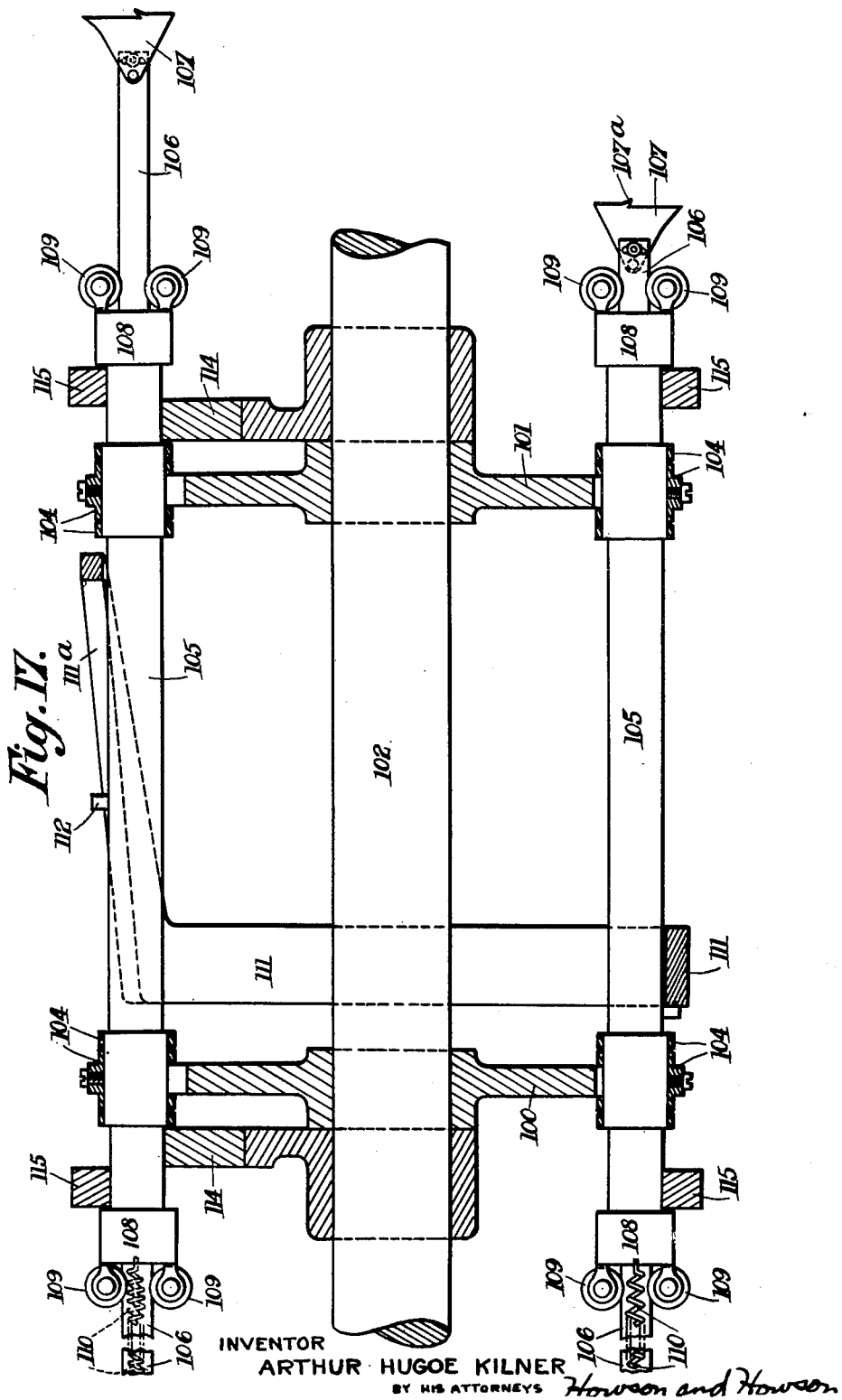

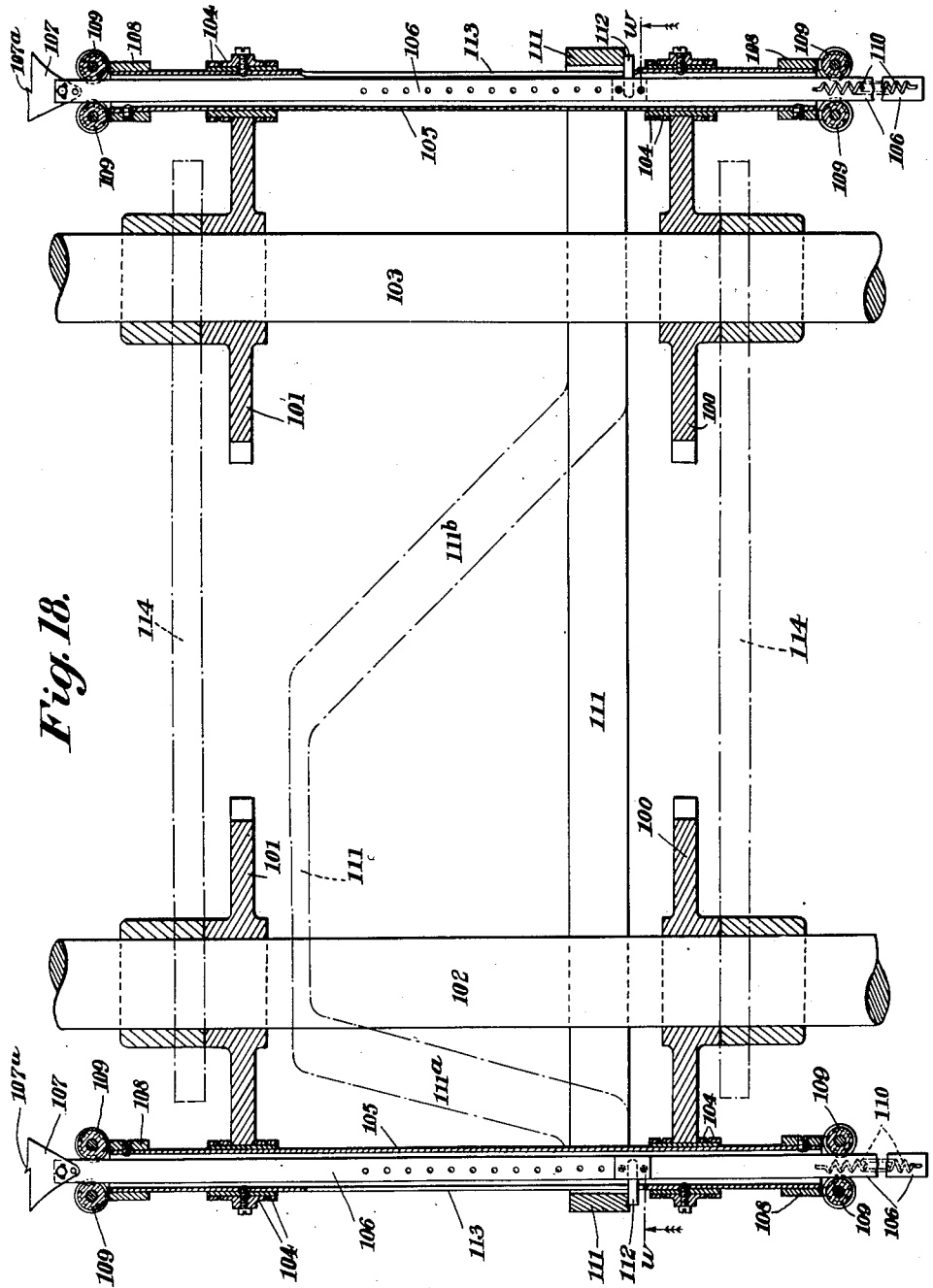

Patented Dec. 27, 1932

1,892,579

UNITED STATES PATENT OFFICE

ARTHUR HUGOE KILNER, OF ST. JOHN'S WOOD, ENGLAND REISSUED

APPARATUS FOR THE PRODUCTION AND MANUFACTURE OF MATERIAL IMPREGNATED WITH CELLULOSE REGENERATED FROM VISCOSE OR OTHER CELLULOSIC SOLUTIONS

Application filed May 3, 1932, Serial No. 608,886, and in Great Britain April 16, 1931.

This invention relates to the process and apparatus for the production and manufacture of material impregnated with cellulose, regenerated from viscose, or other cellulosic solution, wherein cotton, or other fabric, impregnated with cellulose regenerated from viscose, or other cellulosic solution, is stretched laterally to prevent corrugation and lateral shrinkage during its passage through a trough containing a coagulating medium wherein the viscose, or other cellulosic solution, absorbed by the fabric is set by coagulation. Hitherto, the impregnated fabric and the stretching mechanism passed first downwardly and then upwardly through the bath containing the coagulating medium. It has been found that when metal is used this deleteriously affects the metal of the stretching mechanism to such an extent that the parts of the impregnated fabric which contacted therewith emerged from the bath with objectionable stains and moreover, the said coagulating medium attacked the said mechanism thus contaminating the bath of coagulating medium with dissolved metal salts which in turn also give rise to stains in the fabric.

This invention has for its object to produce and manufacture an improved material of the aforesaid kind which is free from blemishes, such for example, as the aforesaid stains, arising from the immersion of the stretching mechanism in the bath containing the coagulating medium, and mainly consists in the step in the process of subjecting the fabric, after it has passed through the outlet slit of the receptacle containing the viscose, or other cellulosic solution, to the action of an endless stretching mechanism, the runs of which travel horizontally, or approximately horizontally, which stretches the fabric laterally and maintains it stretched during its traverse towards and through the greater portion of a bath containing the coagulating medium without any substantial part of the said mechanism contacting with the said medium. The invention also consists in the improved apparatus, hereinafter described, whereby the process can be carried into effect.

The invention will now be particularly described with reference to the accompanying drawings, in which:—

Figures 1 and 1ª illustrate, diagrammatically, apparatus suitable for carrying out the complete process for producing material in accordance with this invention. Figure 2 shows in elevation and Figure 3 in section a portion of the head of the receptacle containing the viscose, or other cellulosic solution; Figures 4 and 5 illustrate in section and elevation, respectively, differential gear by which the feeding roller in the said head is rotated at a speed in accordance with the varying tension of the fabric, which speed is relative to that of the said fabric when in engagement with the stretching mechanism; Figures 6 and 7 are elevations at right angles to each other of the lower portion of the receptacle containing the viscose, or other cellulosic solution, parts being broken away in the said Figure 6; Figure 8 is a section taken on the line $z, z$, Figure 6; Figure 9 is a fragmentary sectional view of the lower portion of the float chamber and a part of the hollow, float-controlled piston valve hereinafter referred to; Figures 10 and 11 illustrate in vertical and horizontal sections, respectively, a fragment of the stretching mechanism and a fragment of the co-acting device for turning up the longitudinal edges of the impregnated material, Figure 10 being a section taken on the line $y, y$, Figure 11 and Figure 11 a section taken on the line $x, x$, Figure 10; Figures 12, 13, 14 and 15 are details illustrating various positions of the pins of the stretching mechanism relatively to the longitudinal edge of the impregnated fabric; Figures 16 and 17 are vertical sections at right angles to each other and Figure 18 is a horizontal section illustrating one of the devices for turning up the longitudinal edges of the fabric, Figure 16 being taken on the line $w, w$, Figure 18, and Figures 17 and 18 being taken on the lines $v, v$, and $u, u$, respectively, Figure 16.

Referring to Figure 1 of the drawings the cotton, or other fabric A, is drawn by a rotatable roller B into the head $c$ of a receptacle C, containing a cellulosic solution such, for example, as viscose through which solution the said fabric passes and is led downwardly to between sealing rollers D and D¹ (hereinafter more particularly described) at, or adjacent to, the lower end $c^1$ of the said receptacle, from which rollers the said fabric is then drawn horizontally, or approximately horizontally, through a controlled outlet slit, or orifice $c^2$ (hereinafter more particularly described) adjacent the said lower end of the receptacle. The feeding roller B is driven through differential gear controlled by tension compensating rollers, indicated at E, at the head $c$ of the receptacle C, which gear and tension rollers are hereinafter more particularly described. The feeding roller B and the sealing rollers D and D¹ are so adapted and mounted that any liability of air entering the receptacle C is practically eliminated so that both the fabric A during its passage through the said receptacle C and the cellulosic solution contained therein is subjected continuously to a vacuum which prevents as far as possible the formation of bubbles in the said solution and consequent blistering thereafter of the produced material. The bath of the cellulosic solution in the receptacle C is made sufficiently deep for the fabric A to remain long enough in the solution to obtain the proper absorption of such solution by the fabric so that the solution may enter into combination with the fibres and threads and fill the interstices and meshes. The impregnated fabric leaving the outlet slit, or orifice, $c^2$, adjacent the lower end of the receptacle C passes through an air space F to between a horizontal or approximately horizontal, device (indicated at G and hereinafter particularly described) which turns up the longitudinal edges of the fabric A, and a horizontal, or approximately horizontal, stretching mechanism (indicated at H and hereinafter particularly described) which engages the said turned-up edges and stretches the fabric laterally during its passage towards and through a horizontal, or approximately horizontal bath, I containing a coagulating medium wherein the cellulosic solution, absorbed by the fabric, is set by coagulation. The construction and arrangement of the stretching mechanism H is such that only the points of the pins of the said mechanism which engage the edges of the fabric A, as hereinafter described, contact with the coagulating medium in the bath I. The fabric A during its passage through the bath I is released from the stretching mechanism H and is then led under a roller J and at, or about, the time it reaches this roller, the required material has been practically produced. In general practice, however, the produced material A¹ is led from the roller J through a trough containing a liquid which frees the said material from chemicals, or chemical solutions so far as it may be necessary, but it is to be understood that the said material may be led from the said roller to any desired place and subjected to any process, or treatment, that may be necessary, or desirable, to render it suitable for a specific purpose, or use. For general purposes, however, the produced material A¹ is preferably first freed from all chemicals, or chemical solutions, as aforesaid, then again stretched, then dried and trimmed and finally wound onto a roller. This may be effected as diagrammatically illustrated in Figure 1ª, wherein the produced material A¹ is led from the roller J over a roller K and under rollers L in a trough M containing a washing liquid which frees the said material so far as it may be necessary of chemicals, or chemical solutions. The material is then drawn from the trough M over a roller N from which it passes to between a second edge turning device (indicated at O and which may be substantially the same as the first edge turning device G, hereinafter particularly described, with the exception that the said device O is adapted to turn the edges downward) and a second stretching mechanism (indicated at P and which may be substantially the same as the first stretching mechanism H hereinafter particularly described) both of which are contained within a drying chamber Q from which the material emerges in a dry condition. The material A¹ as it emerges from the drying chamber Q passes to between rotary cutters R which trim off the longitudinal edges of the material pierced by the pins of the stretching mechanisms H and P and is then led over a roller S to a roller T upon which the finished material is wound.

The viscose, or other cellulosic solution, is supplied to the receptacle C from a tank U by a pump V through a pipe line $v$ which delivers the said solution into the lower part $c^1$ of the said receptacle C. When the lower part $c^1$ is filled with viscose, or other cellulosic solution, the said solution passes (as hereinafter described) to above the sealing rollers D and D¹ and ascends the receptacle C to an overflow pipe $u$ at the upper end thereof which returns it to the tank U and consequently is continuously circulated. The upper part of the tank U is connected by a pipe $u^1$ to an air exhauster (not shown) whereby a vacuum is created above the solution in the said tank and above the solution in the receptacle C so that any air that may be present in the space between the solution in the said receptacle and the feed roller B is exhausted through the pipe $u$ into the space above the solution in the said tank and from thence into the pipe $u^1$. The viscose, or other cellulosic solution, may be conveyed from a source of supply to the tank U by any suitable means which will maintain the said solution at a predetermined level therein, and the said tank may be provided with means, such for example as an indicator, whereby the level of the said solution can be readily ascertained.

The receptacle C containing the viscose, or other cellulosic solution, is sufficiently deep for the fabric A to remain long enough in the said solution to obtain the proper absorption of the solution by the fabric so that the solution enters into combination with the fibres and threads and fills the interstices and meshes in the said fabric, and the front and back walls 1 and 2 of the said receptacle converge towards each other from the upper to the lower end of the said receptacle, all as shown in Figure 1. The front wall 1 of the receptacle C may be constituted by a plate, or its equivalent, bolted or otherwise removably secured to the said receptacle so that, upon its removal access may be had to the interior of the receptacle to permit an operator leading the fabric to be treated round and between the rollers therein and through the outlet slit, or orifice $c^2$. The head $c$ secured to the upper end of the receptacle C consists, as more clearly shown in Figures 2 and 3, of a substantially cylindrical casing 3, of a length greater than the width of the fabric A, having an inlet slit 4 and an outlet slit 5 for the passage of the said fabric, fed by the roller B rotatable within the said cylindrical casing, to the interior of the said receptacle.

The feeding roller B is substantially longer than the width of the inlet slit 4 and comprises a shaft 6 having slidable thereon but rotatable therewith a pair of spaced discs 7, one of which is shown in Figure 2, which fit in the ends of the cylindrical casing and constitute the end covers thereof. On the shaft 6 and extending between the discs 7 is a sleeve 8 of resilient material such for example as cork, having superimposed thereon a covering 9 of fibrous material which likewise extends between the said disc and fits within the cylindrical casing 3 in such manner that air is practically prevented from entering at the inlet 4 and passing round the roller to the outlet 5. The sleeve 8 together with the fibrous material 9 thereon are caused to rotate with the shaft 6 by means of rods, or bolts, 10, which pass through the discs 7 and the said fibrous material and have nuts 11 screwed onto their outer ends which upon being screwed up cause the said discs to slide inwardly on the said shaft and clamp the said sleeve and the covering thereon between them. The covering may by this means be compressed laterally to any desired extent thereby causing it to be forced radially outward so that it effects a close fit within the casing 3. Rotation of the feeding roller B in a clockwise direction, as viewed in Figure 3, draws the fabric A into the inlet slit 4 and between the outer periphery of the fibrous material 9 and the inner periphery of the casing 3 from which it passes to the outlet slit 5 of the said casing.

The feeding roller B is driven through differential gear which consists in, or comprises, a drum 12 (see Figures 4 and 5) rotatably mounted on the shaft 6 of the said roller and having on its outer periphery sprocket teeth 13, or the equivalent, by which rotary motion can be transmitted to the said drum from any suitable source, toothed planet wheels 14, 15 and 16 rotatably mounted within the said drum, a worm 17 secured to the shaft 18 of the planet wheel 14 and a worm wheel 19, secured to the shaft 6, with which the said worm engages. The toothed wheels 15 and 16 engage the toothed wheel 14 at diametrically opposite sides thereof and the shafts 20 and 21 of the said wheels 15 and 16 project through bearings at opposite sides of the drum 12. Secured to the shafts 20 and 21 are toothed pinions 22 and 23 which engage toothed pinions 24 and 25, respectively, secured to, or formed in one with, brake discs 26 and 27, respectively, rotatably mounted on the shaft 6. The discs 26 and 27 are provided with brake devices 28 and 29, respectively, each of which consists of a pair of jaws 30 pivotally mounted on a spindle 31 and having tails connected by links 32 to a solenoid 33, in such manner that when the solenoid is energized the links 32 will cause the jaws to turn inwardly and engage the disc appertaining thereto and consequently retard the rotation thereof. The rotary movement of the drum 12 is transmitted by the worm 17 and worm wheel 19 to the shaft 6 and when the brake devices 28 and 29 are inoperative the whole gear, together with the shaft 6 and the brake discs 26 and 27, rotate as a unit. When, however, either one of the brake devices 28 or 29 is operative the retardation of the brake disc appertaining thereto causes, through the toothed wheels associated therewith, the planet wheel 14 to turn in one direction or the other and in accordance with the direction in which it is rotated the worm 17 thereon will act to slightly accelerate or retard the speed of rotation of the worm wheel 19 relatively to the speed of rotation of the drum 12 and in consequence the speed of the shaft 6 also. Assuming the shaft 6 to be rotating at the normally required speed, the roller B will feed the fabric A at a predetermined rate to a guide roller 34 rotatably mounted within the receptacle C (see Figures 2 and 3) from which the said fabric is led round the tension compensating rollers E and passes therefrom through the bath of cellulosic solution contained in the said receptacle. The tension compensating rollers consist, as shown more clearly in Figure 3, of a roller 35 rotatably mounted on a shaft 36 and a roller 37 rotatably mounted on a rock-shaft 38 which in turn is mounted in bearings in the end walls of the receptacle C. The shaft 36 is carried by arms 39 situated within the receptacle C and secured to the rock-shaft 38. One end of the rock-shaft 38 projects through a wall of the receptacle C and secured to this projecting end is an arm 40 which may, if desired, be counter-balanced such for example as by a weight 41. Secured to the arm 40 is a block 42 to the upper and lower sides of which are secured blades 43 and 44, respectively, which, upon angular movement, upwards or downwards of the arm 40 through a predetermined number of degrees causes one or the other of the said blades to engage one or the other of contact pieces 45 or 46 whereby an electrical circuit appertaining to one of the beforementioned solenoids 33 is completed so that the said solenoid is energized and operates its associate braking device 28. The rollers 35 and 37 and the arm 40 are so arranged that when the fabric A is under normal tension the said arm is in mid-position so that neither of the solenoids 33 is energized. Should, however, the tension of the fabric A increase it will cause the roller 35, arm 39, shaft 38 and the arm 40 to turn in a clockwise direction as viewed in Figure 3, so that the blade 43 is moved into engagement with the contact piece 45 thereby energizing one of the solenoids 33 which in turn actuates the braking device appertaining thereto and through the differential gear causes the worm 17 to rotate in the direction to accelerate the speed of the worm-wheel 19 so that the roller B feeds the fabric A at a slightly greater rate of speed than normally and thereby reduces the tension of the fabric on the rollers 35 and 37 whereupon the aforesaid elements return to their normal position. Vice versa, should the tension of the fabric decrease from normal, it will cause the roller 35, arm 39, shaft 38 and the arm 40 to turn in an anti-clockwise direction, as viewed in Figure 3, so that the blade 44 is moved into engagement with the contact piece 46 thereby energizing the other one of the solenoids 33 which in turn actuates the braking device appertaining thereto and through the differential gear cause the worm 17 to rotate in the direction to retard the speed of rotation of the worm-wheel 19 so that the roller B feeds the fabric A at a slightly reduced rate of speed than normally until the tension of the fabric is again normal whereupon the aforesaid elements return to their original position as before.

The fabric A is led downwardly from the roller 37 to between the sealing rollers D and $D^1$ which are housed, as shown more clearly in Figures 6, 7 and 8, in casings 47 and 48 constituting forward and rearward extensions, respectively of the lower end of the receptacle C. The casings 47 and 48 extend along the full width of the front and back walls, respectively, of the receptacle C and their interiors are in communication with the interior of the said receptacle. The sealing roller D is secured to a shaft 49 one end of which is mounted in a socket 50 formed in one of the side walls of the casing 47 and the other end of the said shaft is mounted in and projects through an orifice formed in the opposite wall of the said casing, and the sealing roller $D^1$ is secured to a shaft 51 one end of which is mounted in a socket 52 formed in one of the side walls of the casing 48 and the other end of the said shaft is mounted in and projects through an orifice formed in the opposite wall of the said casing. Any suitable means may be provided for rotating the shafts 49 and 51 of the sealing rollers D and $D^1$ at the proper speed relatively to the speed of rotation of the drum 12 so that the peripheral speed of the said rollers is the same as the normal peripheral speed of the feed roller B. The fabric A passes from between the rollers D and $D^1$ and around the underside of the roller $D^1$ in the casing 48 from which it is drawn in a horizontal, or approximately horizontal, direction through an evenly prepared and micrometrically adjustable outlet slit, or orifice $c^2$ at the rear end of the said casing as shown more clearly in Figures 6 and 7. The outlet slit or orifice, $c^2$ is constituted by the rear end 48a of the upper wall of the casing 48 and a member 53 yieldably connected by a spring-plate 54 to the rear end 48b of the lower wall of the said casing. Secured to a rock-shaft 55 mounted in brackets 56 on the underside of the lower wall of the casing 48 are counterbalanced arms 57 provided with suitable adjustable counterweights $57^a$ and having stops 58 adjustably mounted in their rear ends which abut against the underside of the member 53 and act, in opposition to the action of the spring-plate 54, to move the said member in the direction to close the slit, or orifice, $c^2$. Normally the slit, or orifice, $c^2$ is kept open a predetermined distance, variable in accordance with the thickness of the fabric A to be drawn therethrough, for example, a distance of about 10 to 25 thousandths of an inch, and this may be effected, as shown in Figures 6 and 7, by cams 59, secured to a shaft 60 mounted in brackets 61 against which cams the counter-balanced arms 57 abut, so that by turning the said shaft, the said cams can be set to permit the member 53 under the action of the spring-plate 54, keeping a predetermined minimum distance from the rear ends 48a of the upper wall of the casing 48. A pointer 62 is secured to the shaft 60 and is moved over a calibrated scale 63 so that any required opening of the slit, or orifice, $c^2$ can be obtained by setting the said pointer on the said scale. This arrangement permits the slit, or orifice, $c^2$ to open automatically to allow of any irregularities in the fabric to pass therethrough without damaging the said fabric.

As before stated the pump V supplies the viscose, or other cellulosic solution, through a pipe $v$ to the lower part of the receptacle C. The forward and rearward casings 47 and 48, respectively, constituting the lower part of the receptacle C are so adapted that the viscose, or other cellulosic solution, supplied thereto by the pipe $v$ is evenly delivered into the said receptacle at each side of the fabric A during its passage therethrough and means are provided whereby the head, or pressure, of the viscose, or other cellulosic solution, in the casing 48 is controlled. This is shown in Figures 6, 7 and 8 as being effected by providing a chamber 64 at the end of the casing 48 through which the ends of the shafts 49 and 51 project and through which said chamber the said shafts also project. The interior of the chamber 64 is in communication with the interior of pipes 65 and 66 which extend through the whole width of the interior of the casing 48 and are situated one above and one beneath the fabric A as shown more clearly in Figure 8. The viscose, or other cellulosic solution, is delivered by the pipe $v$ into the chamber 64 and passes along passages therein surrounding the shafts 49 and 51 and from thence passes, as indicated by the arrows in Figure 8, into the pipes 65 and 66 from which it ultimately passes through orifices $65^a$ and $66^a$ in the respective pipes into the casing 48 at parts thereof above and beneath the run of the fabric A being drawn therethrough. The vacuum created by the air exhauster before referred to, causes the viscose or other cellulosic solution, to pass above the sealing rollers D and $D^1$ and into the space between the lower portions of the converging walls 1 and 2 of the receptacle C and to gradually ascend therein until it reaches the overflow pipe $u$ which conveys it back to the supply and vacuum tank U. Some of the viscose, or other cellulosic solution, passes between the periphery of the sealing rollers D and $D^1$ and the casings 47 and 48 within which they are mounted to above the said rollers and some of the said solution passes by means of a by-pass pipe 67 in communication with the interior of the casing 48 direct into the space between the aforesaid converging walls of the receptacle C. During the initial charging of the casing 48 with viscose, or other cellulosic solution, the air in the upper part of the said casing escapes through the by-pass pipe 67 into the space between the converging walls of the receptacle C and is withdrawn therefrom by the action of the vacuum; likewise, any air, or gas, subsequently accumulated in the said upper part of the casing 48 is drawn by the action of the vacuum through the said by-pass tube. The width of the fabric A is less than the width of the sealing rollers D and $D^1$ so that the viscose, or other cellulosic solution, can pass between the end portions of the said rollers in the space not occupied by the said fabric. The viscous nature of the viscose, or other cellulosic solution acts to seal the orifices in the casing 48 through which the ends of the shafts 49 and 51 project. The head, or pressure, of the viscose, or other cellulosic solution within the casing 48 is so controlled as hereinafter described, that it does not overcome the pressure of the counterbalanced arms 57 which normally act to keep the slit, or orifice, $c^2$ open a predetermined distance as hereinbefore described, and the said head, or pressure, also acts to prevent air entering through the outlet slit, or orifice $c^2$ into the interior of the casing 48 also to prevent leakage, under normal working conditions, of the viscose, or other cellulosic solution, between the longitudinal edges of the fabric A and the sides of the said outlet slit, or orifice. This control of the head or pressure, of the viscose or other cellulosic solution, is effected by means of a valvular device comprising a float chamber 68 situated at the opposite side of the casing 48 to that through which the viscose, or other cellulosic solution, is admitted to the said casing and from which casing the said solution passes through a passage 69 into the said chamber. Within the chamber 68 is a float 70 to the upper end of which is secured a rod 71 slidable in a guide formed on the lower part of a bracket 72 and connected to one end of a spring 73 the other end of which is connected to a screw 74 slidable in a guide formed in the upper part of the said bracket and having a nut 75 thereon by means of which the tension of the spring can be adjusted. Secured to, or formed in one with, the underside of the float 70 is a hollow piston valve 76 slidable in a tubular piece 77 (see Figure 9) secured in a socket 78 in the bottom of the float chamber 68 and in communication, through a pipe line 79, with the interior of the upper portion of the supply tank U (see Figure 1). Communication between the interior of the float chamber 68 and the pipe line 79 is effected through ports $76^a$ in the hollow piston valve 76, upper ports $77^a$ in the tubular piece 77 and controlled by the lower end of the said hollow piston valve, an annular recess $78^a$ formed in the socket 78 and lower ports $77^b$ in the said tubular piece separated from the upper ports therein by a diaphragm $77^c$. The spring 73 is so adjusted that when the viscose, or other cellulosic solution, within the float chamber 68 is at a height in accordance with the required head, or pressure, of the viscose, or other cellulosic solution, in the receptacle C, the float 70 will be in such position that the ports $77^a$ will be half way open as shown in Figure 9 and will remain in this position so long as the quantity of viscose, or other cellulosic solution, pumped into the casing 48 is equal to the quantity of the solution absorbed by the fabric in its passage through the receptacle C and the said casing, plus the quantity drawn through the ports $77^a$ and $77^b$ from the said float chamber into the pipe line 79 by the action of the vacuum created in the upper portion of the supply tank U and the amount which overflows into the pipe u. When the aforesaid head, or pressure, of the viscose, or other cellulosic solution is increased the float 70 will ascend, due to the consequential higher level of the viscose or other cellulosic solution, in the float chamber 68, and the ports 77$^a$ will be opened further so that a greater quantity of the solution will be drawn therethrough by the action of the aforesaid vacuum until the normal head or pressure, of the viscose, or other cellulosic solution is again restored. Vice versa, when the head, or pressure, of the viscose, or other cellulosic solution, is reduced the float 70 will descend in the float chamber 68 and the ports 77$^a$ will be closed further so that a smaller quantity of the solution will be drawn therethrough by the action of the aforesaid vacuum until the normal head, or pressure, is again restored.

The horizontal, or approximately horizontal, stretching mechanism H is situated above the length of impregnated fabric A passing between the outlet slit, or orifice, $c^2$ and the roller J in the bath I containing the coagulating medium, as indicated in Figure 1, and comprises a pair of endless travelling chains 82 passed round pairs of sprocket wheels 83 and 84 secured to shafts 80 and 81 rotated at the required speed by any suitable means, each pair of the said sprocket wheels being situated adjacent to the respective longitudinal edges of the said fabric and at a suitable distance outwardly thereof as more clearly indicated in Figures 10 and 11. The pairs of chains 82 are connected by rods 85 which extend transversely of the impregnated fabric A and the ends thereof pass through the links of the respective chains and constitute the pins thereof. Slidably mounted on each of the rods 85 and adjacent the longitudinal edges of the impregnated fabric A is a pair of carriers 86 both of which are caused, at the proper times, to move simultaneously outwardly towards the longitudinal edges of the impregnated fabric A and inwardly away from the said edges by a pair of spaced stationary cams 87 (encircling the chain of rods 85 and a portion of one of which is shown in Figures 10 and 11) of ring-like formation conforming, in side elevation, to the path of movement of the chains 82, with which cam guide rollers 88 on each of the said carriers engage. Pivotally mounted on the outer portion of each of the carriers 86 are a number of holders 89 each provided with a pin 90 and so adapted that successive pins on the lower run of carriers, upon the outward movement of the latter, engage and penetrate an up-turned portion A$^2$ of each of the longitudinal edges of the impregnated fabric A so that by the further outward movement of the said carriers the said fabric is stretched laterally by, and is supported on, the said pins, as indicated in Figures 14 and 15 respectively. The pins 90 are inclined with their points presented towards the longitudinal edges of the impregnated fabric A, as shown more clearly in Figure 10, so that when the said points have penetrated the up-turned portions A$^2$ of the said edges, as indicated in Figure 14, further movement of the carriers 86 towards the latter causes the holders 89, by reason of the resistance to stretch of the said impregnated material, to turn on their pivots 91 so that the said pins assume a more vertical position and in consequence turn the said edges down into the plane of the said fabric, as indicated in Figure 15. If desired, means, such for example as the screws 92 more clearly shown in Figures 10 and 15, may be provided for adjusting the inclination, or the angular movement, of the holders 89. The lower run of the stretching mechanism H, with a length of impregnated fabric A supported thereby, extends horizontally, or approximately horizontally, to any desired distance into the upper part of the bath I containing the coagulating medium the level of which is such that only the pointed ends of the downwardly projecting pins 90 of the said mechanism and the said fabric thereon enter the said medium. Any suitable means may be provided for maintaining the desired level of the coagulating medium in the bath I, for example this may be effected as diagrammatically indicated in Figure 1, wherein the medium is continuously forced by a pump 93 from a container 94 into a pipe 95 which delivers it into the said bath, from which bath the said medium overflows through a pipe 96, the inlet of which is at the required level, back to the said container, preferably through a filter indicated at 97, within the container. The stationary cam rings 87 may be secured to, or be supported by any suitable means, and are preferably movable laterally so that they can be adjusted to suit the width of the fabric to be treated. The guide rollers 88 during the traverse of the lower run of the carriers 86 run along an outwardly inclined portion 87$^a$ of each of the cam rings 87, as shown in Figure 11, so that the said carriers are thereby moved towards the longitudinal edges of the impregnated fabric A and effect the stretching thereof, as aforesaid, they then run along a portion 87$^b$ of each of the said cam rings adjacent to and parallel with the said edges which maintains the said carriers in the stretching position, until they run along an inwardly inclined portion 87$^c$ of the said cam rings which cause the said carriers to move away from the said longitudinal edges and thereby free the said edges from the pins 90. The guide rollers 88 of the retracted carriers 86 then run along the return and upper run 87$^d$ of each of the cam rings 87 until they again run along the lower run of each of the said cams whereupon the aforesaid movements are repeated. The outwardly projecting parallel portion 87$^b$ of each of the cam rings 87 is of substantial length so that the major portion of the length of the impregnated fabric A passing between the outlet slit, or orifice $c^2$ and the roller J in the bath I is maintained stretched laterally. The upper and lower runs of the chains 82 may be supported on rails 98 (see Figures 1, 10 and 11) through the interposition of hollow anti-friction rollers 99 between the links of the chains and through which the ends of the rods 85 pass.

The devices G for turning up the longitudinal edges of the impregnated fabric A, as aforesaid, consist of a pair of horizontal, or approximately horizontal, endless travelling devices situated at the sides of and parallel with the said longitudinal edges. Each of the said devices comprises, as shown in Figures 16, 17 and 18, two pairs of sprocket wheels 100 and 101 secured at a suitable distance apart to shafts 102 and 103 rotated, at the required speed, by any suitable means. Passing round each pair of sprocket wheels 100 and 101 is an endless chain 104 the links of the respective chains of which are connected by tubes 105 constituting the pins of the said links. Slidable within each of the tubes 105 is a bar 106 having adjustably mounted on its inner end a plate 107 which, at the proper time, acts to turn up the longitudinal edge of the impregnated fabric A. Secured to the ends of each of the tubes 105 are collars 108 each provided with a pair of rollers 109 which support and guide the said bar during its movement in the said tube. A spring 110, having one end attached to the outer end of the bar 106 and its other end attached to the collar 108 on the outer end of the tube 105 appertaining thereto, acts at the proper time, to move the said bar towards the longitudinal edge of the impregnated fabric A with sufficient force to cause the plate 107 on its inner end to engage the said edge. Encircling each chain of tubes 105 is a stationary cam 111 of ring-like formation conforming, in side elevation, to the path of movement of the chain of tubes with which cam studs 112 secured to the bars 106 and projecting through slots 113 in the said tubes are caused to bear by the action of the springs 110. During the traverse of the pair of endless chains of tubes 105, the bars 106 on the upper run thereof are in transverse or approximately transverse alignment, with the impregnated fabric A and they are permitted to advance, under the action of their springs 110, so that the plates 107 thereon engage (as shown in Figure 12) the longitudinal edges of the said fabric, by an inwardly inclined portion 111$^a$ of the upper run of each of the respective cam rings 111 along which inclined portion the pins 112 successively bear during a portion of the said traverse of the endless chains of tubes. When the plates 107 are in engagement with a portion of the longitudinal edge of the fabric A, as shown in Figure 12, the tubes 105 appertaining thereto ride over a pair of stationary cams 114 which act to raise slightly the upper run of the endless chain of tubes 105 and the bars 106 together with the plates 107 thereon, so that a projection 107$^a$ on each of the said plates acts to turn up that portion of the longitudinal edge of the fabric with which it is engaged as shown in Figures 10, 13, 14 and 17, whereupon the beforementioned pins 90 of the stretching mechanism engage the said turned-up portion A$^2$ to effect the stretching of the fabric as aforesaid, Further traverse of the endless chain of tubes 106 then causes the studs 112 of the bars 106 to engage an outwardly inclined portion 111$^b$ of the upper run of the respective cam rings 111 which causes the said bars to return, in opposition to the action of the springs 110, to their inoperative position in which position they are retained by the said cams until, by the continued traverse of the said endless chain of tubes, the studs 112 again engage the inwardly inclined portion 111$^a$ of the respective cam rings 111 whereupon the aforesaid movements of the respective turn-up devices are repeated. Lateral movement of the upper and lower runs of the respective endless chain of tubes 105 may be prevented by guide rails 115 with which the inner sides of the collars 108 engage during the traverse of the said chain of tubes, the lower of the said guide rails act also as a support for the lower run of the said endless chain of tubes.

The positions of the operative portions of the stationary cam rings 87 and 111 relatively to each other are such that when the plates 107 have operated to turn-up the longitudinal edges of the impregnated fabric A, the pins 90 then engage and penetrate the said turned-up edges.

By the method of manufacturing the material according to this invention the said material is produced free from blemishes such, for example as the aforesaid stains which resulted, in the method hitherto adopted, from the immersion of the stretching mechanism in the bath of coagulating medium.

The produced material is eminently suited for the use as, for the purpose of, or in the production of book cloth, oil-cloth, commonly known as American cloth, artificial leather, and wall-covering and may be subjected, before or after washing or drying, to any process, or treatment, that may be desirable for the purposes mentioned or for the particular purpose and use to which it is to be put.

What I claim is:—

1. Apparatus for producing a material impregnated with cellulose, comprising in combination, and approximately vertical receptacle containing cellulosic solution, a roller for feeding fabric to be treated into said receptacle, sealing rollers adjacent the lower end of said receptacle, a casing constituting a horizontal extension at the lower part of and in communication with the said receptacle and having at its rear end an outlet orifice through which said fabric is drawn from said sealing rollers, means for forcing cellulosic solution into said receptacle, means for maintaining vacuum in the space between said feeding roller and the cellulosic solution in said receptacle, means for controlling the pressure of the cellulosic solution in said receptacle, a trough containing a coagulating medium through which the fabric is drawn, and an approximately horizontally traveling stretching mechanism mounted above said coagulating medium for stretching the impregnated fabric laterally during its passage from said outlet orifice towards and through said trough without any substantial part of the said mechanism contacting with the said coagulating medium in said trough.

2. Apparatus for producing a material impregnated with cellulose, comprising in combination, an approximately vertical receptacle containing cellulosic solution, said receptacle having a casing constituting a head, a feeding roller rotatably mounted in said casing for feeding fabric to said receptacle, said casing having an inlet for the passage of the fabric between said roller and said casing and an outlet through which said fabric is led into said receptacle, said roller being substantially longer than the width of said inlet and comprising a shaft, discs, and resilient material on said shaft clamped between said discs whereby said material is caused to fit closely within said casing, sealing rollers adjacent the lower end of said receptacle having a horizontal extension provided with an outlet orifice, means for forcing cellulosic solution into said receptacle, means for maintaining vacuum in the space between said feeding roller and the cellulosic solution in said receptacle, a trough containing a coagulating medium through which the fabric is drawn from said sealing rollers and through said orifice, and an approximately horizontally traveling stretching mechanism mounted above said coagulating medium for stretching the impregnated fabric laterally during its passage from said outlet orifice towards and through said trough without any substantial part of the said mechanism contacting with the said coagulating medium in said trough.

3. Apparatus for producing a material impregnated with cellulose, comprising in combination, a receptacle containing cellulosic solution, a roller for feeding fabric to be treated into said receptacle, a compensating roller in said receptacle in engagement with the fabric from said feeding roller, a differential gear for rotating said feeding roller, and means actuated by said compensating roller and coacting with said differential gear whereby the speed of rotation of said feeding roller is varied automatically to compensate for any variation from the normal rate of travel of the fabric, sealing rollers adjacent the lower end of said receptacle, the lower part of said receptacle having a horizontal extension provided at its rear end with an outlet orifice, means for forcing cellulosic solution into said receptacle, means for maintaining vacuum in the space between said feeding roller and the cellulosic solution in said receptacle, a trough containing a coagulating medium through which the fabric is drawn from said sealing rollers and through said orifice, and an approximately horizontally traveling stretching mechanism mounted above said coagulating medium for stretching the impregnated fabric laterally during its passage from said outlet orifice towards and through said trough without any substantial part of the said mechanism contacting with the said coagulating medium in said trough.

4. Apparatus for producing a material impregnated with cellulose, comprising in combination, a receptacle containing cellulosic solution, a roller for feeding fabric to be treated into said receptacle, a compensating roller in said receptacle in engagement with the fabric from said feeding roller, a differential gear, discs associated with said differential gear, brakes adapted to engage said discs respectively, an electric circuit controlling said brakes, a pivotal mounting for said compensating roller, and a switch actuated by pivotal movement of said compensating roller for energizing said circuit to apply said brakes selectively to said differential gear discs and thereby vary the speed of rotation of said feeding roller, sealing rollers adjacent the lower end of said receptacle, the lower part of said receptacle having a horizontal extension provided at its rear end with an outlet orifice, means for forcing cellulosic solution into said receptacle, means for maintaining vacuum in the space between said feeding roller and the cellulosic solution in said receptacle, a trough containing a coagulating medium through which the fabric is drawn from said sealing rollers and through said orifice, and an approximately horizontally traveling stretching mechanism mounted above said coagulating medium for stretching the impregnated fabric laterally during its passage from said outlet orifice towards and through said trough without any substantial part of the said mechanism contacting with the said coagulating medium in said trough.

5. Apparatus for producing a material impregnated with cellulose, comprising in combination, an approximately vertical receptacle containing cellulosic solution, a roller for feeding fabric to be treated into said receptacle, casings in communication with the interior of said receptacle and extending along the full width of the front and rear walls of the lower portion of said receptacle and constituting forward and rearward extensions thereof, sealing rollers mounted in said casings, the rear casing having at its rear end an outlet orifice through which said fabric is drawn from said sealing rollers, means for forcing cellulosic solution into said receptacle, means for maintaining vacuum in the space between said feeding roller and the cellulosic solution in said receptacle, a trough containing a coagulating medium through which the fabric is drawn, and an approximately horizontally traveling stretching mechanism mounted above said coagulating medium for stretching the impregnated fabric laterally during its passage from said outlet orifice towards and through said trough without any substantial part of the said mechanism contacting with the said coagulating medium in said trough.

6. Apparatus for producing a material impregnated with cellulose, comprising in combination, an approximately vertical receptacle containing cellulosic solution, a roller for feeding fabric to be treated into said receptacle, casings in communication with the interior of said receptacle and extending along the front and rear walls of the lower portion of said receptacle and constituting forward and rearward extensions thereof, one side wall of each casing having a socket, and the opposite wall having a chamber formed therein in communication with the interior of said receptacle, and a shaft in each casing having one end mounted in said socket and the other end passing through said chamber, a sealing roller mounted on said shaft, one of said casings having at its rear end an outlet orifice through which said fabric is drawn from said sealing rollers, means for forcing cellulosic solution into said receptacle, means for maintaining vacuum in the space between said feeding roller and the cellulosic solution in said receptacle, a trough containing a coagulating medium through which the fabric is drawn, and an approximately horizontally traveling stretching mechanism mounted above said coagulating medium for stretching the impregnated fabric laterally during its passage from said outlet orifice towards and through said trough without any substantial part of the said mechanism contacting with the said coagulating medium in said trough.

7. Apparatus for producing a material impregnated with cellulose, comprising in combination, an approximately vertical receptacle containing cellulosic solution, a roller for feeding fabric to be treated into said receptacle, casings in communication with the interior of said receptacle and extending along the front and rear walls thereof and constituting forward and rearward extensions thereof, shafts journaled in said casings, sealing rollers on said shafts, one side wall of each casing having a chamber formed therein in communication with the interior of said receptacle and through which one of said shafts passes, said chamber having passages therein surrounding said shaft, pipes extending transversely through the casing constituting the rearward extension of the lower portion of said receptacle and having orifices therein, means for passing fabric from said sealing rollers, substantially horizontally between said pipes, and means for passing cellulosic solution under pressure into said chamber, whereby said cellulosic solution passes along said passages into said pipes and through said orifices into said casing above and beneath the substantially horizontal run of the fabric therein.

8. Apparatus for producing a material impregnated with cellulose, comprising in combination, an approximately vertical receptacle containing cellulosic solution, a roller for feeding fabric to be treated into said receptacle, sealing rollers adjacent the lower end of said receptacle, a casing associated with said rollers constituting a horizontal extension at the lower part of and in communication with the receptacle and having at its rear end an outlet slit through which said fabric is drawn from said sealing rollers, said outlet slit being formed by the rear end of the upper wall of said casing and a member yieldably connected to the rear end of the lower wall of said casing, and adjustable means for normally keeping said yieldable member at a minimum distance from said upper wall equal to the thickness of the impregnated fabric to be drawn therethrough.

9. Apparatus for producing a material impregnated with cellulose, comprising in combination, an approximately vertical receptacle containing cellulosic solution, a roller for feeding fabric to be treated into said receptacle, a casing associated with said rollers constituting a horizontal extension at the lower part of and in communication with the receptacle and having at its rear end an outlet slit through which said fabric is drawn from said sealing rollers, said outlet slit being formed by the rear end of the upper wall of said casing and a member yieldably connected to the rear end of the lower wall of said casing, a spring plate connecting said yieldable member to said lower wall, counterbalanced arms on the under side of said lower wall, stops adjustable in the rear ends of said arms and abutting on underside of said yieldable member, and means for limiting the movement of said arms in the direction to close said slit so that the latter remains open a predetermined minimum distance.

10. Apparatus for producing a material impregnated with cellulose, comprising in combination, means for impregnating a fabric with cellulose solution, a coagulating bath, means for passing said fabric from said impregnating means through said bath, means for turning up the longitudinal edges of said fabric during such passage, shafts journaled above said bath, sprockets secured to said shafts, endless chains passing round said sprockets and comprising links pinned together by the ends of rods extending transversely of said fabric, a pair of carriers slidably mounted on each of said rods adjacent the longitudinal edges of said impregnated fabric, holders pivoted on said carriers, pins in said holders, and means for causing said carriers on the lower run of said chain to move simultaneously toward the longitudinal edges of the impregnated fabric to cause the pins to penetrate said edges and for causing a further movement of said carriers to stretch the fabric.

11. Apparatus for producing a material impregnated with cellulose, comprising in combination, means for impregnating a fabric with cellulose solution, a coagulating bath, means for passing said fabric from said impregnating means through said bath, means for turning up the longitudinal edges of said fabric during such passage, shafts journaled above said bath, sprockets secured to said shafts, endless chains passing round said sprockets and comprising links pinned together by the ends of rods extending transversely of said fabric, a pair of carriers slidably mounted on each of said rods adjacent the longitudinal edges of said impregnated fabric, holders pivoted on said carriers, pins in said holders, guide rollers on the respective carriers, and a pair of spaced stationary cams of ring-like formation encircling said chain of rods, with which cams said guide rollers engage, for causing said carriers on the lower run of said chain to move simultaneously toward the longitudinal edges of the impregnated fabric to cause the pins to penetrate said edges and for causing a further movement of said carriers to stretch the fabric.

12. Apparatus for producing a material impregnated with cellulose, comprising in combination, means for impregnating a fabric with cellulose solution, a coagulating bath, means for passing said fabric from said impregnating means through said bath, means for turning up the longitudinal edges of said fabric during such passage, shafts journaled above said bath, sprockets secured to said shafts, endless chains passing round said sprockets and comprising links pinned together by the ends of rods extending transversely of said fabric, a pair of carriers slidably mounted on each of said rods adjacent the longitudinal edges of said impregnated fabric, holders pivoted on said carriers, pins in said holders, and means for causing said carriers on the lower run of said chain to move simultaneously toward the longitudinal edges of the impregnated fabric to cause the pins to penetrate said edges and for causing a further movement of said carriers to stretch the fabric, said pins being respectively inclined toward the adjacent longitudinal edge of the impregnated fabric, whereby further movement of said carrier toward said edge turns said holder on its pivot and thereby turn the upturned portion of said edge down into the plane of said fabric.

13. Apparatus for producing a material impregnated with cellulose, comprising in combination, means for impregnating a fabric with cellulose solution, a coagulating bath, means for passing said fabric from said impregnating means through said bath, means for turning up the longitudinal edges of said fabric during such passage, shafts journaled above said bath, sprockets secured to said shafts, endless chains passing round said sprockets and comprising links pinned together by the ends of rods extending transversely of said fabric, a pair of carriers slidably mounted on each of said rods adjacent the longitudinal edges of said impregnated fabric, holders pivoted on said carriers, pins in said holders, and means for causing said carriers on the lower run of said chain to move simultaneously toward the longitudinal edges of the impregnated fabric to cause the pins to penetrate said edges and for causing a further movement of said carriers to stretch the fabric, said pins being respectively inclined toward the adjacent longitudinal edge of the impregnated fabric, whereby further movement of said carrier toward said edge turns said holder on its pivot and thereby turn the upturned portion of said edge down into the plane of said fabric, and means for adjusting the angular movement of the holders relative to their carriers.

14. Apparatus for producing a material impregnated with cellulose, comprising in combination, means for impregnating a fabric with cellulosic solution, a coagulating bath, means for passing said fabric from said impregnating means through said bath, means for turning up the longitudinal edges of said fabric during said passage, comprising a pair of approximately horizontal endless traveling devices at the sides of and parallel with said edges, each of which devices comprises two pair of sprocket wheels secured in spaced relation on rotatable shafts, an endless chain passed round each pair of sprocket wheels, tubes connecting the links of the respective chains and constituting the pins thereof, a bar slidable in each of said tubes, a plate on the inner end of each of said bars, and means whereby the bars carried by the upper run of said endless chain of tubes are caused to advance in succession and in timed relation and engage the longitudinal edges of the fabric, means for causing said bars to rise so that a projection on each of said plates turn up said edges and then return to their normal position relative to the tubes carrying them, and an approximately horizontally traveling stretching mechanism mounted above said coagulating bath having portions engaging said turned up edges for stretching the fabric during its passage toward and through said coagulating medium.

15. Apparatus for producing a material impregnated with cellulose, comprising in combination, means for impregnating a fabric with cellulosic solution, a coagulating bath, means for passing said fabric from said impregnating means through said bath, means for turning up the longitudinal edge of said fabric during said passage, comprising a pair of approximately horizontal endless traveling devices at the sides of and parallel with said edges, each of which devices comprises two pair of sprocket wheels secured in spaced relation on rotatable shafts, an endless chain passed round each pair of sprocket wheels, tubes connecting the links of the respective chains and constituting the pins thereof, a bar slidable in each of said tubes, a plate on the inner end of each of said bars, and a stationary cam of ring like formation encircling the said endless chain of tubes a stud on each of said bars and springs operating to maintain the studs in engagement with the said stationary cam, whereby the bars carried by the upper run of said endless chain of tubes are caused to advance in succession and in timed relation and engage the longitudinal edges of the fabric, for causing said bars to rise so that a projection on each of said plates turn up said edges and then return to their normal position relatively to the tubes carrying them, and an approximately horizontally traveling stretching mechanism mounted above said coagulating bath having portions engaging said turned up edges for stretching the fabric during its passage toward and through said coagulating medium.

16. Apparatus for producing a material impregnated with cellulose, comprising in combination, means for impregnating a fabric with cellulosic solution, a coagulating bath, means for passing said fabric from said impregnating means through said bath, means for turning up the longitudinal edges of said fabric during said passage, comprising a pair of approximately horizontal endless traveling devices at the sides of and parallel with said edges, each of which devices comprises two pair of sprocket wheels secured in spaced relation on rotatable shafts, an endless chain passed round each pair of sprocket wheels, tubes connecting the links of the respective chains and constituting the pins thereof, a bar slidable in each of said tubes, a plate on the inner end of each of said bars, and means whereby the bars carried by the upper run of said endless chain of tubes are caused to advance in succession and in timed relation and engage the longitudinal edges of the fabric, a pair of stationary cams over which the upper run of the respective endless chain of tubes ride, for causing said bars to rise so that a projection on each of said plates turns up said edges and then return to their normal position relatively to the tubes carrying them, and an approximately horizontally traveling stretching mechanism mounted above said coagulating bath having portions engaging said turned up edges for stretching the fabric during its passage toward and through said coagulating medium.

In testimony whereof I have signed my name to this specification.

ARTHUR HUGOE KILNER.